United States Patent
Spetler

(10) Patent No.: US 7,739,905 B2
(45) Date of Patent: Jun. 22, 2010

(54) METHOD OF ESTIMATING A HEIGHT OF WATER IN CONTACT WITH A TIRE ON A ROAD

(75) Inventor: Frederic Spetler, Lezoux (FR)

(73) Assignee: Michelin Recherche et Technique S.A., Granges-Paccot (CH)

(*) Notice: Subject to any disclaimer, the term of this patent is extended or adjusted under 35 U.S.C. 154(b) by 254 days.

(21) Appl. No.: 12/061,961

(22) Filed: Apr. 3, 2008

(65) Prior Publication Data
US 2008/0245454 A1   Oct. 9, 2008

(30) Foreign Application Priority Data
Apr. 6, 2007   (FR) .................................. 07 02576

(51) Int. Cl.
*G01M 17/02* (2006.01)
(52) U.S. Cl. .................................... 73/146; 152/209.18
(58) Field of Classification Search .................. None
See application file for complete search history.

(56) References Cited

U.S. PATENT DOCUMENTS

| | | | |
|---|---|---|---|
| 5,502,433 A | 3/1996 | Breuer et al. | 340/438 |
| 5,864,056 A | 1/1999 | Bell et al. | 73/146 |
| 6,666,079 B2 | 12/2003 | Poulbot et al. | 73/146 |
| 6,991,013 B2 | 1/2006 | Poulbot et al. | 152/152.1 |
| 7,267,148 B2 | 9/2007 | Merino-Lopez et al. | 152/152.1 |
| 2003/0056579 A1 | 3/2003 | Poulbot et al. | 73/146 |
| 2003/0101805 A1 | 6/2003 | Raab | 73/116 |
| 2004/0036590 A1 | 2/2004 | Elsner et al. | 340/445 |
| 2005/0188756 A1 | 9/2005 | Morikawa | 73/146 |
| 2006/0207319 A1 | 9/2006 | Krozer et al. | 73/146 |
| 2007/0163692 A1* | 7/2007 | Miyasaka et al. | 152/209.18 |
| 2007/0295074 A1 | 12/2007 | Kobayakawa | 73/146.5 |
| 2008/0011092 A1 | 1/2008 | Miyoshi et al. | 73/779 |
| 2008/0210022 A1 | 9/2008 | Rey et al. | 73/862.621 |

FOREIGN PATENT DOCUMENTS

| | | |
|---|---|---|
| DE | 42 42 726 A1 | 6/1994 |
| DE | 102 42 121 A1 | 3/2004 |
| DE | 10 2004 051 654 A1 | 4/2006 |

(Continued)

*Primary Examiner*—Lisa M Caputo
*Assistant Examiner*—Jermaine Jenkins
(74) *Attorney, Agent, or Firm*—Fitzpatrick, Cella, Harper & Scinto

(57) ABSTRACT

A method of estimating the height of water ($h_w$) that is present on a wet ground of a road and that is in contact with a tread of a tire of a vehicle travelling on this wet road utilizes one or more sensors in the tread of the tire. Each of the one or more sensors is capable of measuring a characteristic quantity of stresses that the tread experiences locally when the tire is rolling on the ground. A signal corresponding to these measurements is produced, and a portion of this signal relating to a passing of the one or more sensors into an apparent area of contact between the tire and the ground is extracted. An instantaneous value ($\Delta L$), relating to a length of an indirect contact region of the apparent area of contact between the tread of the tire and the ground, is determined from this information, and a water height ($h_w$) is estimated from a calculation that takes into account the determined instantaneous value.

12 Claims, 5 Drawing Sheets

FOREIGN PATENT DOCUMENTS

| | | |
|---|---|---|
| EP | 0 937 615 A2 | 8/1999 |
| EP | 1 076 235 A1 | 2/2001 |
| EP | 1 231 120 A1 | 8/2002 |
| EP | 1 350 640 A1 | 10/2003 |
| EP | 1 498 291 A1 | 1/2005 |
| JP | 2002-087032 A | 3/2002 |
| WO | WO 02/08721 A1 | 1/2002 |
| WO | WO 2006/117480 | 11/2006 |

* cited by examiner

METHOD OF ESTIMATING A HEIGHT OF WATER IN CONTACT WITH A TIRE ON A ROAD

FIELD OF THE INVENTION

The present invention relates to the estimation of the height of water in contact with a tire on a wet road travelled by a vehicle. It relates more particularly to calculating an estimate of a height of water based on measuring stresses in a tread of the tire of the vehicle.

BACKGROUND

It is in fact useful to be able to estimate a height of water present on a road in real time so as to better appreciate the onset of hydroplaning.

Hydroplaning is characterized by the momentary presence of an amount of water between the ground making up the road and that part of the tire tread in contact with the ground. In this case, the film formed by the presence of water prevents all or some of this contact—there is no longer grip and therefore no longer force transferred between the vehicle and the road.

A film of water forms between all or part of the tire tread in contact with the ground when the flow rate of water flowing between these two surfaces becomes greater than the flow rate of water that the features of the road pavement and that of the tire can remove. This saturation effect is dependent on the height of water present on the ground and the speed of the vehicle.

The consequences of hydroplaning, during an acceleration by application of a driving force, during a deceleration by application of a braking force or during a change in direction, are considerable and can involve a partial or complete loss of control of the vehicle. It is therefore of paramount importance when travelling on a wet surface to be able to anticipate the conditions for hydroplaning.

To the driver of the vehicle, no warning sign precedes the onset of partial or complete hydroplaning—the danger is sudden and cannot be foreseen.

In addition, the water height measurement is information that can be taken into account by the various electronic assistance devices used, for example, for controlling an antilock braking system (ABS) of the vehicle, antiskid regulation (ASR) of the driving wheels, and trajectory control (ESP) or other forms of control or monitoring, such as for example the monitoring of tire pressure. Such information, coupled for example with a measurement of tire grip, would enable the effectiveness of these devices to be greatly improved in real time.

It is known from U.S. Pat. No. 5,502,433 to detect hydroplaning, but no mention is made of taking into account or estimating the height of water on the ground of the road. That patent merely involves observing a hydroplaning phenomenon beneath the tire, without providing a way to quantify it or even to determine one of the parameters of the origin of this phenomenon.

SUMMARY OF THE INVENTION

In the following discussion, unless otherwise indicated, the following meanings generally apply:

"apparent area of contact": that portion of the tire tread in which one or more sensors in the tire tread give a non-zero signal;

"direct contact area": that portion of the tire tread in which contact between the ground and the tread is a direct contact; and "indirect contact area": that portion of the tire tread in which a film of water lies between the tread and the ground.

One aspect of the invention is directed to a method of estimating the height of water ($h_w$) that is present on wet ground of a road and that is in contact with a tread of a tire of a vehicle travelling on this wet ground, the tread of the tire being equipped with one or more sensors each capable of measuring a characteristic quantity of stresses that the tread undergoes locally when the tire is rolling on the ground. This method is characterized in that it includes the following steps:

obtaining measurements of a characteristic quantity when a tire is rolling on a ground;

producing a signal corresponding to the measurements;

extracting a portion of the signal relating to a passing of one or more sensors into an apparent area of contact between the tire and the ground;

determining an instantaneous value ($\Delta L$), relating to a length of an "indirect contact" region of the apparent area of contact between the tire tread and the ground, based on the extracted portion of the signal; and estimating a water height ($h_w$) from a calculation that takes into account the determined instantaneous value.

The characteristic quantity is measured by the one or more sensors and may advantageously be characteristic of a compression experienced by the tread of the tire in a direction normal to a plane of the ground.

In this case, the step of determining an instantaneous value is such that:

when the extracted portion of the signal includes two successive plateaus, the instantaneous value is a measurement of a length ($\Delta L$) of the first plateau on an entry side of the apparent area of contact; and when the extracted portion of the signal includes a single plateau, the instantaneous value is zero.

The characteristic quantity measured by the one or more sensors may also be characteristic of a longitudinal shear experienced by the tire.

The step of determining an instantaneous value is then such that:

when the extracted portion of the signal includes, on the entry side of the apparent area of contact, two successive positive peaks, the instantaneous value is a measurement of a length ($\Delta L$) separating respective maxima of the two peaks; and when the extracted portion of the signal includes a single positive peak, the instantaneous value ($\Delta L$) is zero.

A sensor implanted in the tread can also measure both a characteristic quantity of a normal compression and a characteristic quantity of a longitudinal shear experienced by the tread.

An estimate of the instantaneous value ($\Delta L$) is then advantageously a weighted average of estimates determined from signals corresponding to normal compression and signals corresponding to longitudinal shear.

Advantageously, the water height ($h_w$) is determined from the instantaneous value ($\Delta L$) using a chart.

Such a chart may be established experimentally by carrying out measurements of characteristic signals of compression or longitudinal shear of measurement blocks of the tread for various water heights, wherein the measurement blocks have sensors incorporated thereon or therein.

The water height ($h_w$) may also be determined using the following equation:

$$h_w = K\{1 - \cos(\arcsin\tfrac{\square}{K})\}^L,$$

where $h_w$ is the estimated water height, $\Delta L$ is the instantaneous value, and K is a constant associated with the tire.

The constant K may advantageously be estimated by the Koutny transition zone radius ($R_K$), which is substantially constant for a given tire. Variations in belt curvature may be represented using a simple geometric model known as the Koutny model. The Koutny model utilizes three tangential circular arcs. One arc corresponds to a curvature in an upper part of the tire, and the other two arcs are identical to each other and correspond to a tire curvature when entering and leaving the contact area (i.e., the apparent area of contact). Knowing the length of the contact path and the invariable length of the belt, this model can be used to calculate $R_K$. The Koutny transition zone radius is well known to those skilled in the art in the field of tires.

Advantageously, the method according to an embodiment of the invention may be supplemented by estimating a degree of hydroplaning from the water height ($h_w$) and from a speed of the vehicle. This estimate is advantageously obtained from an experimental chart connecting a quantity $1-S/S_0$ at the speed for various water heights, in which:

- a first surface S determines an instantaneous area of direct contact of the tire tread measured on wet ground at the speed of the vehicle; and
- a second surface $S_0$ determines a maximum ideal area of direct contact of the tire tread on dry ground and/or for a low speed of the vehicle guaranteeing that hydroplaning cannot start.

Another aspect of the invention is directed to a device for estimating a height of water ($h_w$) that is present on wet ground of a road and that is in contact with a tread of a tire of a vehicle travelling on this wet ground. The device includes:

- a tire, the tire having a tread that is equipped with one or more sensors each capable of measuring a characteristic quantity of stresses experienced locally by the tread rolling on the ground;
- a transmitter for transmitting a signal corresponding to measurements of the characteristic quantity; and
- a signal processing unit configured to extract, from the transmitted signal, a signal portion corresponding to a number or to a duration of passage of one or more sensors in an area of contact of the tire rolling on the ground.

This device is characterized in that it includes, in the processing unit, a program for implementing a method according to an embodiment of the invention, such as the method described above, on the basis of the extracted signal portion.

BRIEF DESCRIPTION OF THE DRAWINGS

The invention will be more clearly understood upon reading the following description and upon examining the drawings that accompany it. These drawings have been given merely by way of example illustrations and in no way do they limit the claimed invention.

The figures in the drawings show.

DETAILED DESCRIPTION OF EMBODIMENTS OF THE INVENTION

Figure 1:
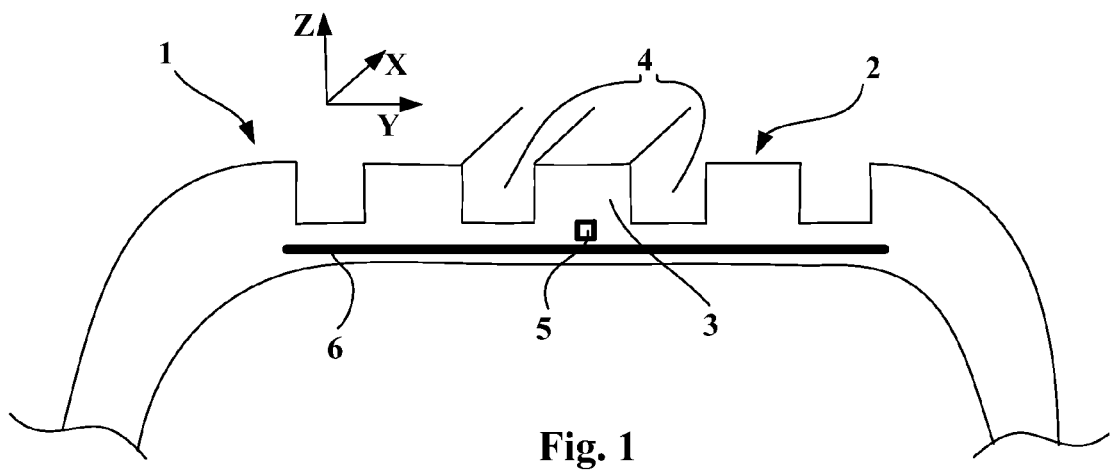
FIG. 1: a schematic representation of a sensor in a tread of a tire.

FIG. 1 shows a highly schematical partial axial cross section of a tire 1 with its tread 2. This tread 2 may also correspond to that of a resilient non-pneumatic tire.

The outer surface of the tread 2 of the tire 1 is not smooth but usually includes a number of longitudinal grooves 4 and transversal or substantially transversal grooves for facilitating water evacuation on a wet road. The longitudinal and transversal grooves define blocks of rubber that come into contact with the road surface and correspond to a pattern of the tread of the tire 1. In FIG. 1, the block 3 lies between longitudinal grooves 4 and two transversal grooves (not shown).

Some of the blocks 3 include a stress sensor 5 (or a sensor for sensing another equivalent quantity). What is thus obtained is a measurement block. The sensor 5 is implanted into a base of the measurement block 3 and above reinforcing plies 6 of the tire's structure. It is desirable to place the sensor 5 in a volume of the tire rubber that does not undergo wear during the lifetime of the tire. In this way, measurements are possible throughout the lifetime of the tire. According to an embodiment of the invention, the sensors measuring the stresses are preferably placed in or on blocks 3 located at the center of the tire width along the y-axis of FIG. 1, that is, between its two shoulders. However, it is readily possible within the context of the invention for a sensor 5 to be placed on or in a shoulder.

An objective of the sensors is to enable the measurement of a stress (or a force) experienced by the tire tread 2 or, according to a variant, a displacement or even a strain of this tread 2.

The sensors used 5 may operate according to various technologies—they may be piezoelectric or piezoresistive gauges or capacitors. Thus, it is possible for example to combine a Hall-effect sensor with a magnetic element, the whole assembly being embedded in the rubber of the tire. For more details about the technologies employed for these sensors, the reader may refer to U.S. Pat. No. 6,666,079, which gives a description of the various stress sensors that may be used in a tire.

Figure 2:
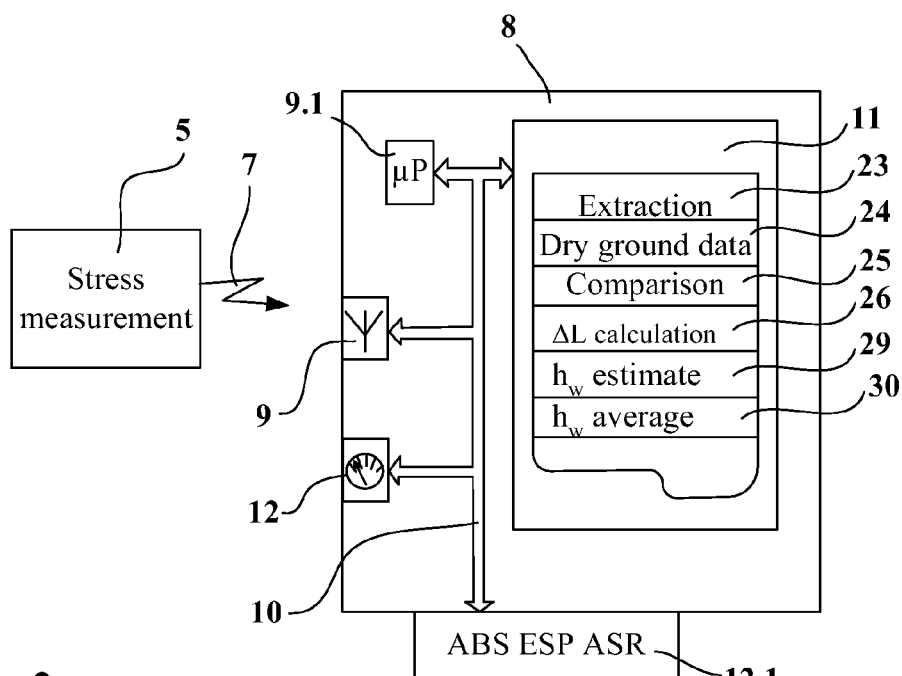
FIG. 2: a schematic representation illustrating a device according to an embodiment of the invention.

FIG. 2 schematically illustrates a measurement device according to an embodiment of the invention. The device includes a sensor 5 for measuring stresses and a transmission device or means 7 for transmitting the signal to a signal processing unit 8. The processing unit 8 is preferably placed in the vehicle. In a variant, the processing unit 8 may be placed in the tire itself. This variant requires a transmission device or means for transmitting a processed signal to the driver of the vehicle.

Those skilled in the art also know the various possible forms of transmission devices or means for transmitting a signal between a tire and a vehicle employing the tire. For this purpose, the reader may refer to European patent document EP-A-1 350 640, which illustrates in particular an antenna implanted in a tire. This antenna is positioned within the actual tread 2 of the tire and is linked via a cable to a sensor 5.

This antenna may be an electric field antenna of the quarter-wave type, or may be a frequency-modulation or amplitude-modulation type of antenna for transmitting a power signal. It is useful to point out here that a primary antenna fixed on the vehicle facing a secondary antenna placed in the tire also makes it possible, by an inductance effect, to transmit power from the primary antenna, for example connected to a battery of the vehicle, to the secondary antenna so as to deliver energy to the sensor 5. A microbattery inserted with the sensor 5 into a premoulded insert in the tread 2 may also provide this function.

In FIG. 2, signals corresponding to stress measurements are transmitted via the transmission device or means 7 to the processing unit 8 after having been picked up by an antenna 9.

Moreover, operation of the sensor 5 may take place via an electronic measurement circuit of an ASIC (application-specific integrated circuit) type, a supply system, such as that mentioned above, and a system for encoding measurements, all of these units operating before transmission of the measurements constituting the signal to be analyzed. The antenna 9 is connected to a microprocessor 9.1 of the processing unit 8 via an internal connection bus 10.

The processing unit 8 includes a program memory 11. A program stored in the memory 11 makes it possible, according to various program sections, to process the signals until information about a water height $h_w$ is obtained. Once the information has been obtained, via the connection bus 10, the information may be displayed on a display unit 12 placed inside the actual vehicle.

For example, the display unit 12 may take the form of a dial displaying relative and easily interpretable data. This is because intrinsic water height data may be of only limited significance to the driver of the vehicle. What is more important for the driver is to be aware of the water height so as therefore to regulate his speed, such as by reducing his speed or by adapting his type of driving, for example by driving more cautiously and less aggressively. The information may for example be in the form of a green zone indicating a low measured water height, an amber zone indicating a substantial water height hazardous to driving, or a red zone indicating a water height deemed to be critical.

The information about the water height $h_w$ may also be transmitted, additionally or only, to various active safety devices 12.1 present on the vehicle.

These safety devices 12.1 include an antilock braking system (ABS) and trajectory correction (ESP) or antiskid (ASR) devices. These devices 12.1 take into account, instantly and according to various criteria, a behaviour of the tire on the ground. It is therefore advantageous for these devices 12.1 to incorporate an additional criterion that takes the height of water on the ground into account.

These various active safety devices 12.1 may thus improve their sensitivity by taking into account the height of water $h_w$ present in front of and/or beneath the tire.

Figure 3:
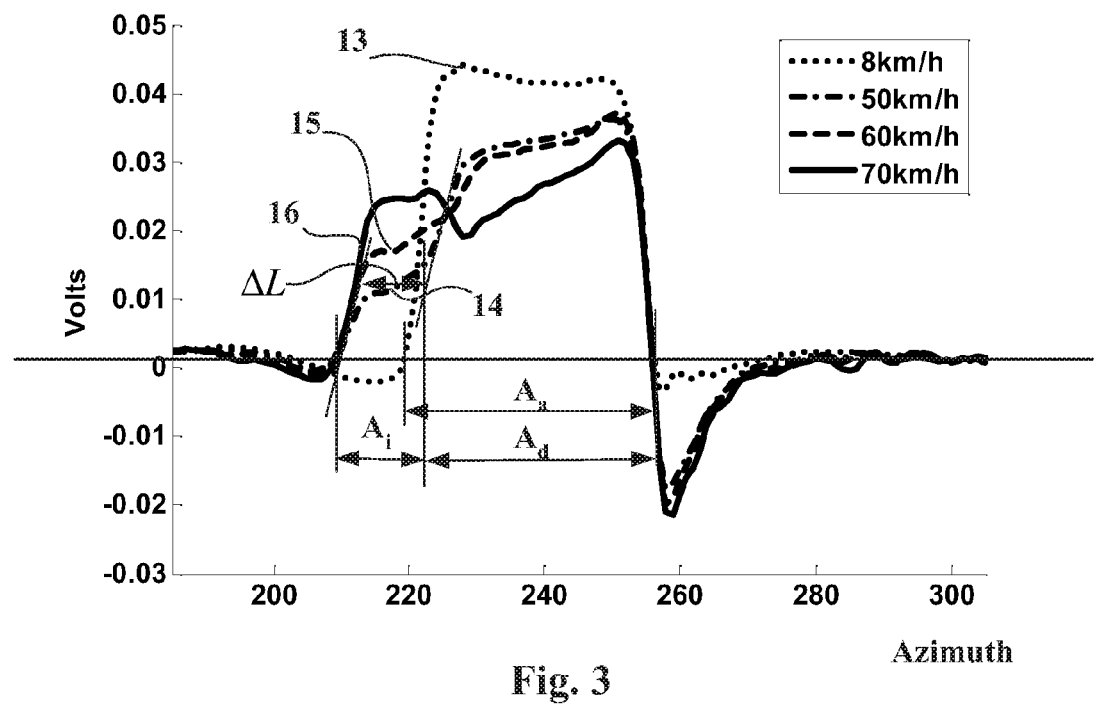
FIGS. 3 and 4: curves corresponding to recordings of measurements of normal stresses in a contact area of a tire as a function of various rolling speeds and for two defined water heights, 2 mm and 8 mm, respectively.

FIG. 3 shows several curves corresponding to signals obtained by normal stress measurements as a function of the tread 2 of the tire 1 rolling along the ground corresponding to the road. These various curves correspond to various tire rolling speeds. The scale on the y-axis is arbitrary and corresponds to values given by a measurement sensor 5 in volts.

Shown on the x-axis are positions of measurement points in an apparent contact area according to an order number of the measurements in question. Sampling is carried out with 512 measurements per revolution. These order numbers are directly linked to respective azimuths of the measurement points.

Thus, a linear deployment of one complete circumference, that is, one complete revolution of the under measurement on the ground, corresponds on the x-axis, in the current example, to 512 measurement points.

FIG. 3 shows that the measurement signals have almost zero amplitude at the start and at the end of the signals, disregarding a slight offset. To simplify matters, in the case of measuring stresses normal to the ground, that portion of the measurement signals in which the amplitude of these signals is positive is referred to as the "apparent contact area". A positive value of the measurement signals corresponds to a compression of a measurement block 3, and a negative value corresponds to an extension of the measurement block.

In FIG. 3, the signals were obtained experimentally for a predetermined water height of 2 mm on the ground. The measured stresses are those corresponding to compressive stresses undergone or experienced by the tread 2 of the tire 1 and more precisely by a sensor 5 in the tread 2 during its passage in the apparent contact area with a plane of the ground, along a direction normal to the plane of the ground.

Curve 13 in FIG. 3 represents a signal corresponding to stress measurements for a low tire rolling speed, namely 8 km/h. At this low speed, the presence of a height of water on the ground has no effect on a normal stress signal, and the signal detected at this speed corresponds to that which may be found on a completely dry road. Thus, when a stress sensor or sensors (i.e., measurement block(s)) lies or lie outside a direct contact area of the tread with the ground of the road, the measured stresses are substantially zero. That part of the curve corresponding to negative stress measurements corresponds to a section of the tread leaving a region of compression on the ground and resuming a natural curvature of the tire.

With the above definition, it is possible to estimate a length of the apparent contact area $A_a$, which in this case is also the direct contact area $A_d$, by a portion of the curve 13 indicated as $A_a$.

Curves 14, 15, and 16 were obtained experimentally for the same water height of 2 mm at speeds of 50, 60, and 70 km/h, respectively. These curves have a substantially different form from that of curve 13. Having normalized all the curves to a point where, to a rear of the apparent contact area, the stress passes through zero again, it may be seen that the apparent contact area $A_a$ is substantially elongated at a start of the apparent contact area. This shows a first plateau, a height of which increases with increasing speed. It is possible to estimate that a length of this first plateau or an instantaneous value $\Delta L$ corresponds to a length of an indirect contact area $A_i$, that is, the area in which a water film lies between the tread and the ground. It may also be seen that the length of the direct contact area $A_d$ is substantially reduced relative to that of curve 13.

To be able to estimate the length of the indirect contact area $A_i$, a method according to an embodiment of the invention determines the instantaneous value $\Delta L$. FIG. 3 illustrates a method of determining $\Delta L$ in which a shift between the two successive rising fronts associated with the first plateau and then the second plateau is determined. This shift, as illustrated in the case of curve 14, has a value that practically does not vary with speed within a wide speed range. It may also be seen that curve 16, obtained at a speed of 70 km/h, has a form that is difficult to interpret, in which the two plateaus seem to have a similar height. This indicates that hydroplaning has become very pronounced.

Thus, an elongation of the contact area ΔL is practically independent of the rolling speed of the tire. The presence of the first plateau for the signal of curve 14, as soon as the tire is rolling at a speed of for example 40 km/h, is due to the appearance of further stresses.

These further stresses are due to a height of water present just in front of the tire over its entire width, along the Y axis of the tread 2. This height of water thus has the effect of establishing an intermediate contact between the ground of the road and the tread 2 of the tire, before direct contact of a sensor with the ground of the road.

The stress is therefore always generated between the ground and the tread 2 of the tire but via the liquid element that the height of water forms. The first plateau obtained from the signal is therefore that of a sensor detecting a stress on the ground via the liquid element corresponding to this height of water. This signal therefore represents the resistance (hydrostatic pressure) offered by the water to the measurement block, which depends on the rolling speed according to $P \approx \frac{1}{2} \rho V^2$ (ρ being the density and V the rolling speed). At low speed, the height of water present does not have the effect of providing the same first plateau on the measured signal, because the entry of the sensor into the corresponding volume of water requires sufficient speed to create sufficient resistance or tension on the part of the liquid element, and consequently a significant stress.

Figure 4:
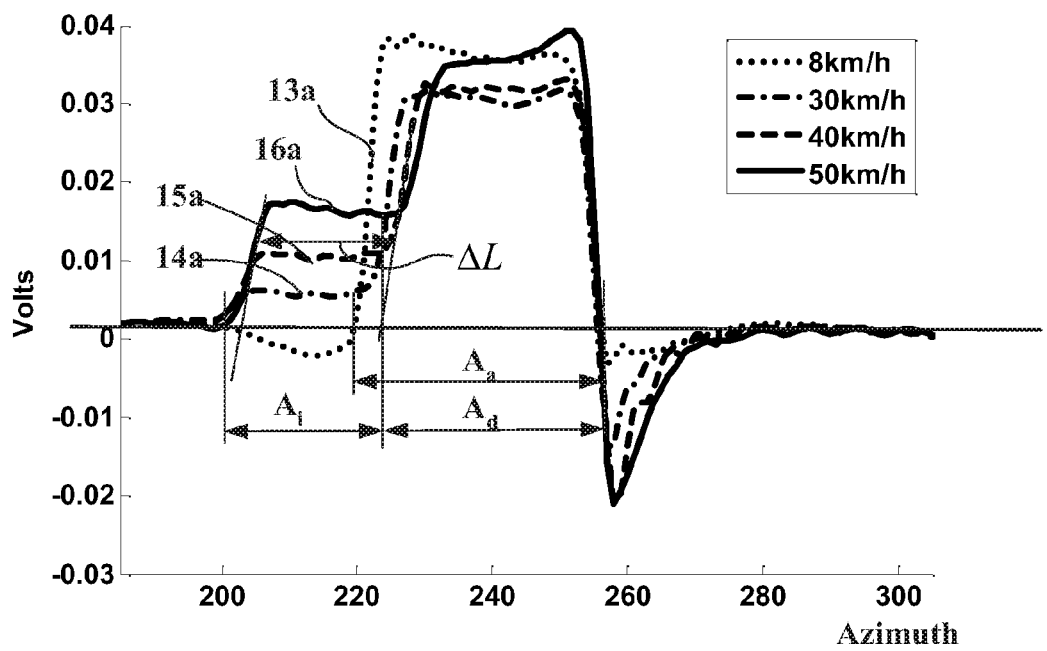

Plotted in FIG. 4 on the y-axis and x-axis, respectively, are the same parameters described in the case of FIG. 3, and the respective curves 13a, 14a, 15a, and 16a correspond to tire rolling speeds of 8, 30, 40, and 50 km/h, but for an 8 mm water height on the road.

At a low speed (8 km/h), curve 13a is very substantially identical to curve 13 obtained for a 2 mm water height. For higher vehicle speeds, in this case 30, 40, and 50 km/h, an elongation of the contact area ΔL on the road is again observed. These results are obtained for a used tire, strictly identical to that providing the results shown in FIG. 3, in this case a Michelin Energy 195/65R15 XHI tire.

In the latter case, that is, for a water height of 8 mm, the elongation ΔL of the contact area is greater than that obtained for a water height of less than 2 mm. Also, in this case, it is observed that the elongation ΔL obtained for a water height of 8 mm does not depend, once detected thanks to a sufficient speed, on the rolling speed of the tire.

Its length is however greater, because the height of water present frontally is larger compared with the width of the tire tread.

Thus, the contact established by the presence of this liquid medium between the tread of the tire and the ground of the road is established higher up on the tire, and therefore contact occurs earlier. The sensor therefore enters earlier into a part corresponding to an apparent area of indirect contact (because this takes place via a water film) between the ground and the tread 2 of the tire 1. That part of the signal corresponding to an elongation ΔL of the contact area is therefore larger.

Then, starting from a measurement index close to 225, contact is again a direct contact between the ground and the tread, and the stress signals for curves 14a, 15a, and 16a are substantially identical to those obtained for curves 14, 15, and 16 of FIG. 3.

The passage of a tread sensor or measurement block into the area of contact with the ground of the road therefore has two parts: a first part ($A_i$) corresponding to contact of the measurement block with the ground of the road, but via a liquid element corresponding to the height of water, which height it is desired to estimate, and a second part ($A_d$) corresponding to direct contact of the measurement block with the ground of the road.

Figure 5:
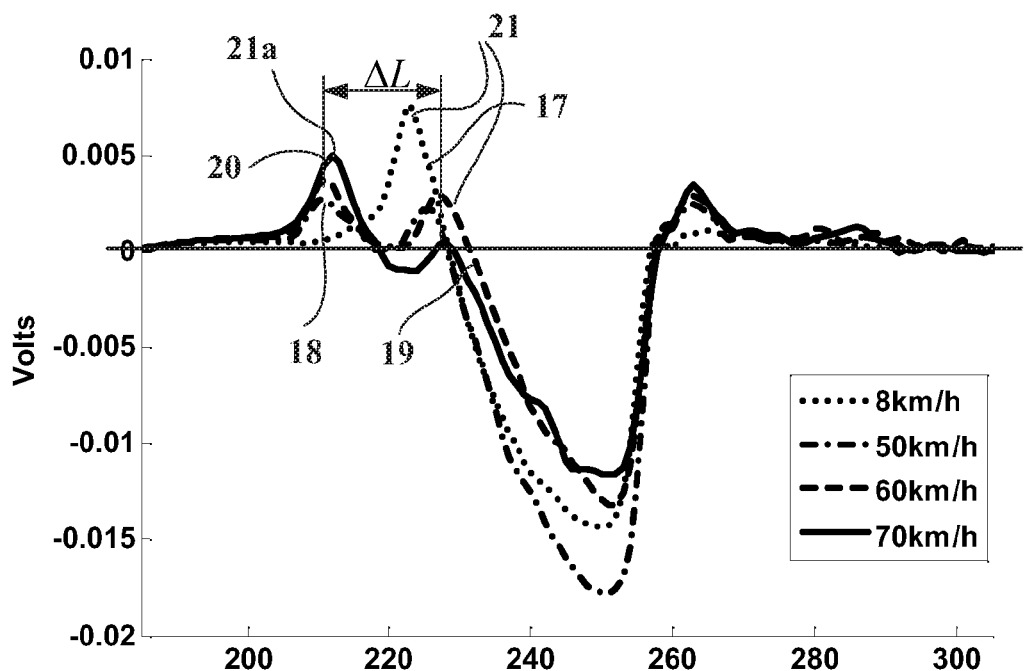
FIGS. 5 and 6: curves corresponding to recordings of measurements of longitudinal stresses in a contact area of a tire as a function of various rolling speeds and for two defined water heights, 2 mm and 8 mm, respectively.

In FIG. 5, curves 17, 18, 19, and 20 are obtained for speeds of 8, 50, 60, and 70 km/h of the tire on the ground, respectively. These curves show, plotted on the y-axis, shear stresses occurring along the X axis of the tread, that is, along a circumferential direction of the rolling of the tire on the ground, and, plotted on the x-axis, measurement points all along the tread. Only part of the tread is shown here, and corresponds to the significant measurements.

Again at low speed, in this case 8 km/h, a stress signal obtained for curve 17 is similar or substantially similar to that obtained for a ground that is dry or that is wet but does not have a significant height of water. At the moment of contact of the measurement block 3, in which the stress sensor is located, with the ground, the shear stresses recorded become positive or driving stresses (oriented in the rolling direction), pass through a maximum 21, and then, during the remainder of the time the sensor or the measurement block is present in the area of contact with the ground, the shear stresses move towards negative or braking values, i.e., opposing the rolling direction of the tire. Finally, on leaving the contact area, the stresses experienced by the tread 2 are again substantially zero. This "S-shaped signal" corresponds to the conventional mechanics of a pneumatic tire tread in contact with the ground, well known to those skilled in the art.

For substantial speeds of 50, 60, and 70 km/h corresponding to curves 18, 19, and 20, respectively, there again appears the peak 21 corresponding to the same physical phenomenon, together with a first peak 21a called an anticipated peak, which is detected before the peak 21. This anticipated first peak 21a, of positive stress, is higher the greater the speed. For reasons similar to those mentioned above in the case of FIGS. 3 and 4, the appearance of this first peak 21a arises from the entry, at a high enough speed, of a longitudinal stress sensor into the height of water present between the tire tread 2 and the ground.

Now, when the distance ΔL between the two peaks 21a and 21 of a given curve is measured, this distance ΔL is substantially identical for all the curves studied, namely 18, 19, and 20, respectively. As in the case of compressive stresses, this ΔL value is therefore independent of the tire rolling speed.

Thus the instantaneous value chosen, which is representative of the elongation of the contact area for both types (compressive and shear) of stresses, is the same, namely ΔL.

Figure 6:
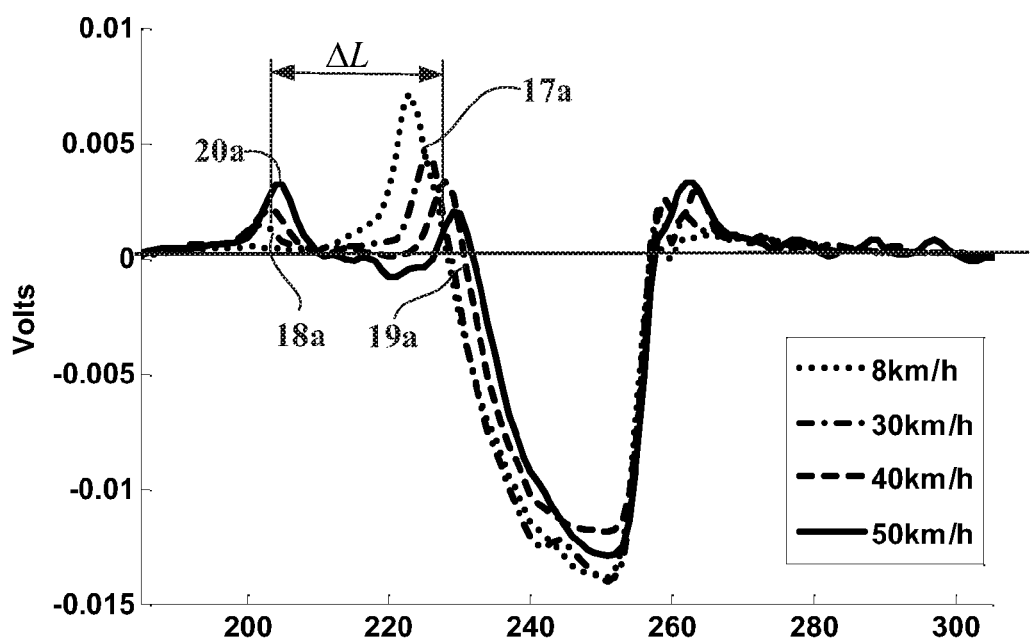

In FIG. 6, for curves 17a, 18a, 19a, and 20a studied for speeds of 8, 30, 40, and 50 km/h, respectively, and for a greater water height, namely 8 mm, this instantaneous value of the distance ΔL between the two first peaks, which are distinguished above a speed of 30 km/h, is greater. This instantaneous value nevertheless remains constant for all the speeds studied at this same water height.

The reason for the elongation of the distance ΔL between the two longitudinal stress peaks is the same as that mentioned above in the case of FIGS. 3 and 4. A higher, and therefore earlier, entry of the sensor into a contact area between the tire and the ground, via the liquid medium, is established.

The first part of the contact area established between the longitudinal stress sensor and the ground, via the liquid medium corresponding to the height of water, is more measurable when the speed of the tire is high enough. This is because sufficient tension or pressure must be present, thanks to the speed between the tire and the ground, on the volume of water in question.

Thus, for the four curves studied in FIGS. 3 to 6, a total contact area corresponding to both direct and indirect areas of contact between the ground and the tread 2 appears for substantial compressive or shear stress values. The values displayed outside this total area of contact, via the liquid medium or directly with the ground of the road, are substantially zero.

Returning to the device of FIG. 2, a subprogram 23 of the program 11 of the processing unit 8 is used to extract a part of the signal received from the sensors corresponding to a substantially non-zero stress signal, for example typically above a threshold, in absolute value.

Thus, the extraction of the part of the signal, for compressive stresses, corresponding to one or more sensors passing into the apparent contact area of the tread 2, consists in extracting the part of the signal when the sensor (or sensors) emits (or emit) a significant stress measurement signal, a duration of this part of the signal corresponding to a duration of a passage of the sensor(s) through the apparent contact area.

The memory 11 includes a data area 24, which contains data of a signal obtained for compressive stresses according to the axis z of FIG. 1 on dry ground or at low speeds. These stresses correspond to the compressive stresses to which the tread 2 of the tire 1 is subjected to upon entering the area of contact with the plane of the road.

Using a subprogram 25, a comparison is then made between the data of the signal extracted by the program 23 and the data stored in the data area 24 so as to establish a difference in the duration of the passage of a sensor or sensors through the apparent contact area.

A computation section of the program 26, by a simple rule of three, calculates an instantaneous value 22 of an elongation of the contact area $\Delta L$, with a number of measurements per rotation and the rolling speed being known.

To study the signal corresponding to shear stresses, a part of the signal is extracted for positive quantities greater than a significant threshold, for example a thousandth of a volt, in which case the subprogram 26 takes into account a duration of the presence of a sensor between two positive peak values of the signal received during a wheel rotation. Thus, in the same way as previously, the subprogram 26 directly calculates, knowing the number of sensor measurements on a wheel rotation and/or the running speed, the instantaneous value 22 $\Delta L$ corresponding to the value of the distance between two peaks.

Figure 7:
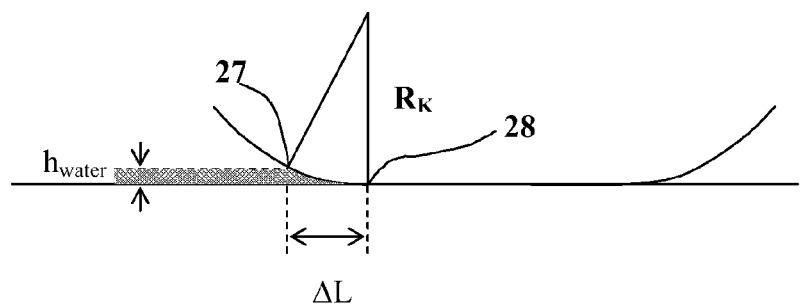
FIG. 7: a schematic representation of the ratio of water height to an elongation of an apparent contact area of a tire.

FIG. 7 schematically shows a tire with its localized flattened area on the ground and also the presence of water in front of the tire.

This presence of water is defined as a water height $h_w$ and determines, along the circumference of the tire, two points, namely a first point 27 where the water comes into contact with the tire, but where the edge of the tire with the stress sensors (i.e., the measurement block(s)) is not yet in contact with the ground of the ground, and a second point 28 where the water is tangential both to the ground and to the tire, but where the tread 2 of the tire makes contact with the ground.

Between these two points, the curvature of the tire matches a radius well known to those skilled in the art, called a Koutny transition zone radius $R_K$, but is substantially different from the radius of the tire, and takes into account the flattening of the tire in contact with the road, implying a different radius of curvature at entry into the contact area and at exit therefrom than in the upper part of the tire.

Taking an orthogonal projection of the first point 27 on the ground representing the road, a distance along the ground corresponding to the elongation $\Delta L$ of the contact area is then determined between this projection and the second point 28.

This elongation $\Delta L$ of the area of contact of the tread with the ground corresponds substantially to that measured by the sensors 5, via the liquid medium, and for sufficiently high speeds.

This geometric model provides a trigonometric relationship between $\Delta L$ and $h_w$ according to the formula:

$$\Delta L = R_K \sin\{\arccos(1 - h_w/R^K)\} |$$

and the formula:

$$h_w = K\left\{1 - \cos\left(\arcsin\frac{\Delta}{-}K\right)\right\}^L.$$

A computer program 29 in the memory 11 of the processing unit 8 then determines, from this formula and from knowledge of the instantaneous value 22 $\Delta L$, an estimate of the water height $h_w$.

Figure 8:
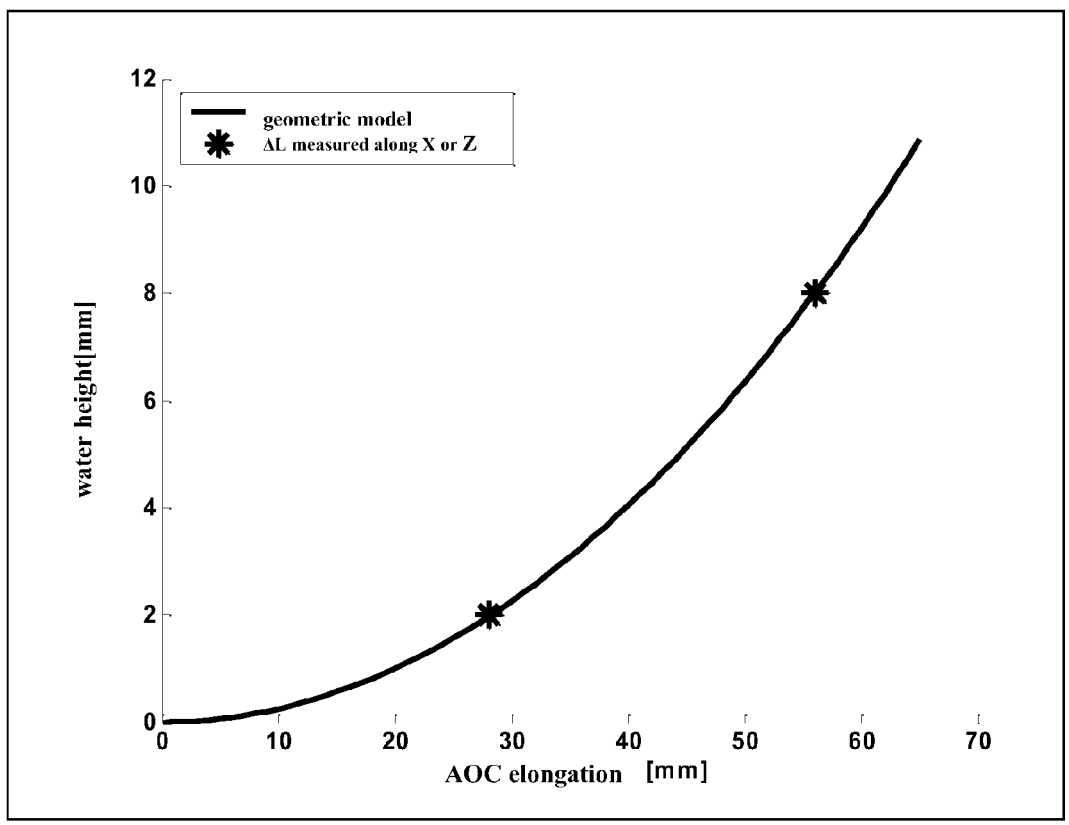
FIG. 8: a comparison between theoretical and experimental values linking water height to elongation of a contact area of a tire.

FIG. 8 shows the match between the water height obtained by the above theoretical formula and knowing the instantaneous value 22 $\Delta L$ (obtained from the stresses measured during the method described) and the actually measured cases, in which the water height is actually 2 or 8 mm. This figure indicates that it is very reasonable to model the estimate of $h_w$ starting from $\Delta L$ using the above trigonometric formula, because $\Delta L$ and $h_w$ fit well with the above formula in the cases of the actual analytical measurements described.

A computer program 30 is also used to determine an average value of the calculation of the water height obtained using the compressive stresses and, in addition, using the shear stresses, for example according to a strict average of the two items of information or according to a weighted average. This program 30 then makes it possible to improve the robustness of the calculation for estimating the water height.

Figure 9:
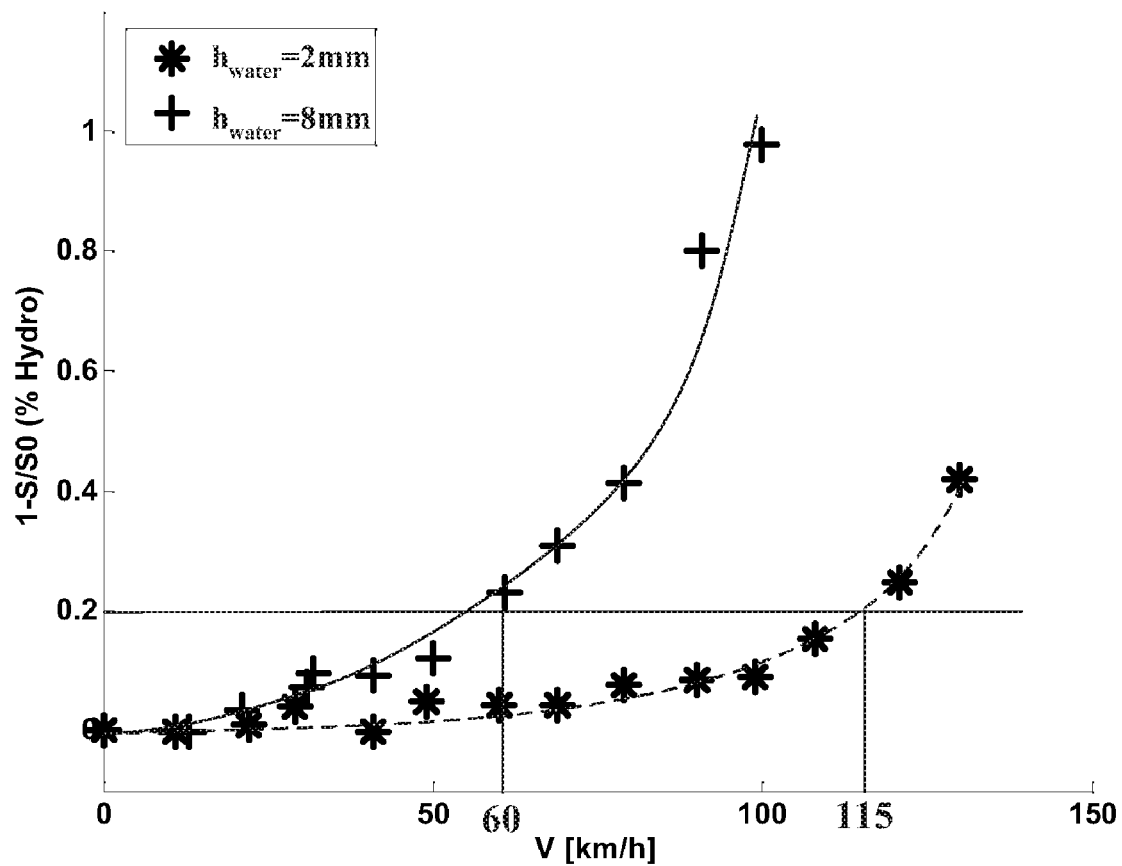
FIG. 9: a curve illustrating a quantity $1-S/S_0$ as a function of a speed of a tire and for two water heights, 2 and 8 mm, respectively.

FIG. 9 shows the variation of a quantity $1-S/S_0$ used in characterizing the phenomenology of hydroplaning as a function of the rolling speed V of a tire for two water heights, 2 mm and 8 mm, respectively.

The quantity S of the ratio defines the measured instantaneous direct contact area or surface between the tire tread and wet ground. The direct contact area corresponds to an area between the material of which the ground of the road is made and the material of which the tire tread is made, with no intermediate material, that is, without the presence of a film of water between the ground and that part of the tire tread rolling on the ground.

Thus, on a road having a certain height of water, this direct contact area is reduced when a film of water causing the onset of hydroplaning starts to occur.

The second quantity $S_0$ defines the direct contact area or surface between the tire tread and the same road surface when dry or defines the contact area between the tire tread on wet ground but for a low vehicle speed.

This is because in the latter case, the low speed of the vehicle guarantees not only a low resistance of the water present in front of the tire or tires of the vehicle but makes it possible most particularly for the patterns on the tire tread to act over a longer period for evacuating the water between the tire and the ground and thus prevent the formation or the onset of formation of a water film.

The quantity $S_0$ is therefore the maximum direct contact surface that the tire can develop on the road, irrespective of the speed and the water height.

The quantity $1-S/S_0$ is therefore zero in the absence of hydroplaning even with a height of water on the road, as well as in the case of low speeds between 0 and about 20 km/h, and is equal to 1 when there is complete hydroplaning beneath the tire.

This figure illustrates the very strong influence of the speed and the water height on the occurrence of hydroplaning. For a water height on the road of 2 mm (dotted curve), the 20% hydroplaning threshold is reached at a speed of 115 km/h, whereas this threshold is reached at 60 km/h for a water height of 8 mm (solid curve).

The hydroplaning phenomenology is thus correctly represented and characterized by the quantity $1-S/S_0$.

The invention is not limited to the examples described and shown, and various modifications may be made to them without departing from its scope as defined by the appended claims.

The invention claimed is:

1. A method of estimating a height of water ($h_w$) present on a ground of a road when wet, the water being in contact with a tread of a tire of a vehicle travelling on the ground of the road, and the tread of the tire being equipped with one or more sensors each capable of measuring a characteristic quantity of stresses that the tread experiences locally when the tire is rolling on the ground, the method comprising:
    obtaining measurements of a characteristic quantity when a tire is rolling on a ground, the measurements being obtained from one or more sensors;
    producing a signal corresponding to the measurements;
    extracting a portion of the signal relating to a passing of the one or more sensors into an apparent area of contact between the tire and the ground;
    determining an instantaneous value ($\Delta L$) corresponding to a length of an indirect contact region of the apparent area of contact between the tread of the tire and the ground, based at least in part on the extracted portion of the signal; and
    estimating the height of the water ($h_w$) from a calculation that takes into account the determined instantaneous value.

2. A method according to claim 1, wherein the characteristic quantity measured by the one or more sensors is a compression experienced by the tread of the tire in a direction normal to a plane of the ground.

3. A method according to claim 2, wherein the determining of the instantaneous value includes:
    when the extracted portion of the signal includes two successive plateaus, measuring the instantaneous value as a length ($\Delta L$) of a first plateau, on an entry side of the apparent area of contact; and
    when the extracted portion of the signal includes a single plateau, measuring the instantaneous value as zero.

4. A method according to claim 1, wherein the characteristic quantity measured by the one or more sensors is a longitudinal shear experienced by the tread of the tire.

5. A method according to claim 4, wherein the determining of the instantaneous value includes:
    when the extracted portion of the signal includes, on an entry side of the apparent area of contact, two successive positive peaks, measuring the instantaneous value as a length ($\Delta L$) separating respective maxima of the two peaks; and
    when the extracted portion of the signal includes a single positive peak, measuring the instantaneous value ($\Delta L$) as zero.

6. A method according to any one of claims 1 to 5, wherein the one or more sensors measure both a characteristic quantity corresponding to a normal compression and a characteristic quantity corresponding to a longitudinal shear experienced by the tread of the tire, and wherein an estimate of the instantaneous value ($\Delta L$) is a weighted average of estimates determined from signals corresponding to the normal compression and signals corresponding to the longitudinal shear.

7. A method according to any one of claims 1 to 5, wherein the height of the water ($h_w$) is determined from the instantaneous value ($\Delta L$) using a chart.

8. A method according to any one of claims 1 to 5, wherein the height of the water ($h_w$) is determined according to:

$$h_w = K\{1 \square \cos(\arcsin\frac{\square}{}K)\}^L,$$

where $h_w$ is an estimated height of the water, $\Delta L$ is the instantaneous value, and K is a constant associated with the tire.

9. A method according to claim 8, wherein the constant K is a Koutny transition zone radius ($R_K$).

10. A method according to any one of claims 1 to 5, the method further comprising estimating a degree of hydroplaning from the height of the water ($h_w$) and a speed of the vehicle.

11. A method according to any one claims 1 to 5, wherein the measured characteristic quantity is a stress.

12. A device for estimating a height of water ($h_w$) present on a wet ground of a road and in contact with a tread of a tire of a vehicle travelling on the wet ground, the device comprising:
    a tire, the tire having a tread that is equipped with one or more sensors each configured to measure a characteristic quantity of stresses experienced locally by the tread rolling on a ground;
    a transmitter for transmitting a signal corresponding to measurements of the characteristic quantity obtained by the one or more sensors; and
    a signal processing unit configured to extract, from the transmitted signal, a signal portion corresponding to a number or to a duration of passage of the one or more sensors in an area of contact of the tire rolling on the ground, wherein the signal processing unit is configured to execute a program for implementing a method of estimating a height of water ($h_w$) present on a ground of a road based on the extracted signal portion, the method including:
    obtaining measurements of the characteristic quantity when the tire is rolling on the ground, the measurements being obtained from the one or more sensors;
    producing the signal corresponding to the measurements;
    extracting the portion of the signal relating to the passing of the one or more sensors into the apparent area of contact between the tire and the ground;
    determining an instantaneous value ($\Delta L$) corresponding to a length of an indirect contact region of the apparent area of contact between the tread of the tire and the ground, based at least in part on the extracted portion of the signal; and
    estimating a height of water ($h_w$) from a calculation that takes into account the determined instantaneous value.

* * * * *